United States Patent
Ginzton

(10) Patent No.: US 8,019,861 B2
(45) Date of Patent: Sep. 13, 2011

(54) SPECULATIVE VIRTUAL MACHINE RESOURCE SCHEDULING

(75) Inventor: Matthew David Ginzton, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 125 days.

(21) Appl. No.: 12/362,109

(22) Filed: Jan. 29, 2009

(65) Prior Publication Data

US 2010/0191845 A1    Jul. 29, 2010

(51) Int. Cl.
   *G06F 15/173* (2006.01)
(52) U.S. Cl. ............... 709/224; 709/223; 709/226
(58) Field of Classification Search .......... 709/223, 709/224, 226; 713/310; 718/1; 726/24; 370/392; 399/70; 340/584
   See application file for complete search history.

(56) References Cited

U.S. PATENT DOCUMENTS

| | | | |
|---|---|---|---|
| 6,802,062 | B1 | 10/2004 | Oyamada et al. |
| 7,203,944 | B1 | 4/2007 | van Rietschote et al. |
| 2007/0244937 | A1 | 10/2007 | Flynn, Jr. et al. |
| 2007/0288224 | A1 | 12/2007 | Sundarrajan et al. |
| 2008/0127348 | A1 * | 5/2008 | Largman et al. ............ 726/24 |
| 2009/0106571 | A1 * | 4/2009 | Low et al. .................. 713/310 |
| 2009/0293055 | A1 * | 11/2009 | Carroll et al. ............... 718/1 |
| 2009/0300605 | A1 * | 12/2009 | Edwards et al. ............. 718/1 |
| 2010/0008363 | A1 * | 1/2010 | Ee et al. ................... 370/392 |
| 2010/0023939 | A1 * | 1/2010 | Takahashi ................. 718/1 |
| 2010/0104309 | A1 * | 4/2010 | Ferlitsch .................. 399/70 |
| 2010/0127881 | A1 * | 5/2010 | Schechter et al. .......... 340/584 |

OTHER PUBLICATIONS

Nelson, Michael et al., "Fast Transparent Migration for Virtual Machines", 2005 USENIX Annual Technical Conference, pp. 391-394.
Milojicic, Dejan S. et al., "Process Migration", ACM Computing Surveys, vol. 32, No. 3, Sep. 2000, pp. 241-299.
Sapuntzakis, Constantine P. et al., "Optimizing the Migration of Virtual Computers", USENIX, 2002, pp. 1-14.

* cited by examiner

*Primary Examiner* — Le Luu

(57) ABSTRACT

A speculative virtual machine ("VM") resource scheduler for a VM that is hosted by a primary host server initiates the creation of at least one duplicate VM on a secondary host server. The VM and the duplicate VM are run substantially in lockstep while the scheduler monitors resources on the primary host server and the secondary host server. The scheduler then determines an advantageous host server among the primary host server and the secondary host server and, based at least in part on the determination, initiates the powering down of either the VM on the primary host server or the duplicate VM on the secondary host server.

27 Claims, 3 Drawing Sheets

SPECULATIVE VIRTUAL MACHINE RESOURCE SCHEDULING

BACKGROUND INFORMATION

"Virtualization" generally describes the separation of a resource or request for a service from the underlying physical delivery of that service. With virtual memory, for example, computer software gains access to more memory than is physically installed, via the background swapping of data to disk storage. Similarly, virtualization techniques can be applied to other information technology infrastructure layers, including networks, storage, laptop or server hardware, operating systems, applications, etc. and can collectively be referred to as a "virtual infrastructure".

A virtual infrastructure provides a layer of abstraction between computing, storage and networking hardware, and the applications running on it. The deployment of a virtual infrastructure is typically non-disruptive, since the user experiences are largely unchanged. However, a virtual infrastructure gives computer system administrators the ability to manage pooled resources across an enterprise, allowing them to better leverage infrastructure investment.

SUMMARY OF THE INVENTION

One embodiment is a speculative virtual machine ("VM") resource scheduler for a VM that is hosted by a primary host server. The scheduler initiates the creation of at least one duplicate VM on a secondary host server. The VM and the duplicate VM are run substantially in lockstep while the scheduler monitors resources on the primary host server and the secondary host server. The scheduler then determines an advantageous host server among the primary host server and the secondary host server and, based at least in part on the determination, initiates the powering down of either the VM on the primary host server or the duplicate VM on the secondary host server.

DETAILED DESCRIPTION

Figure 1:
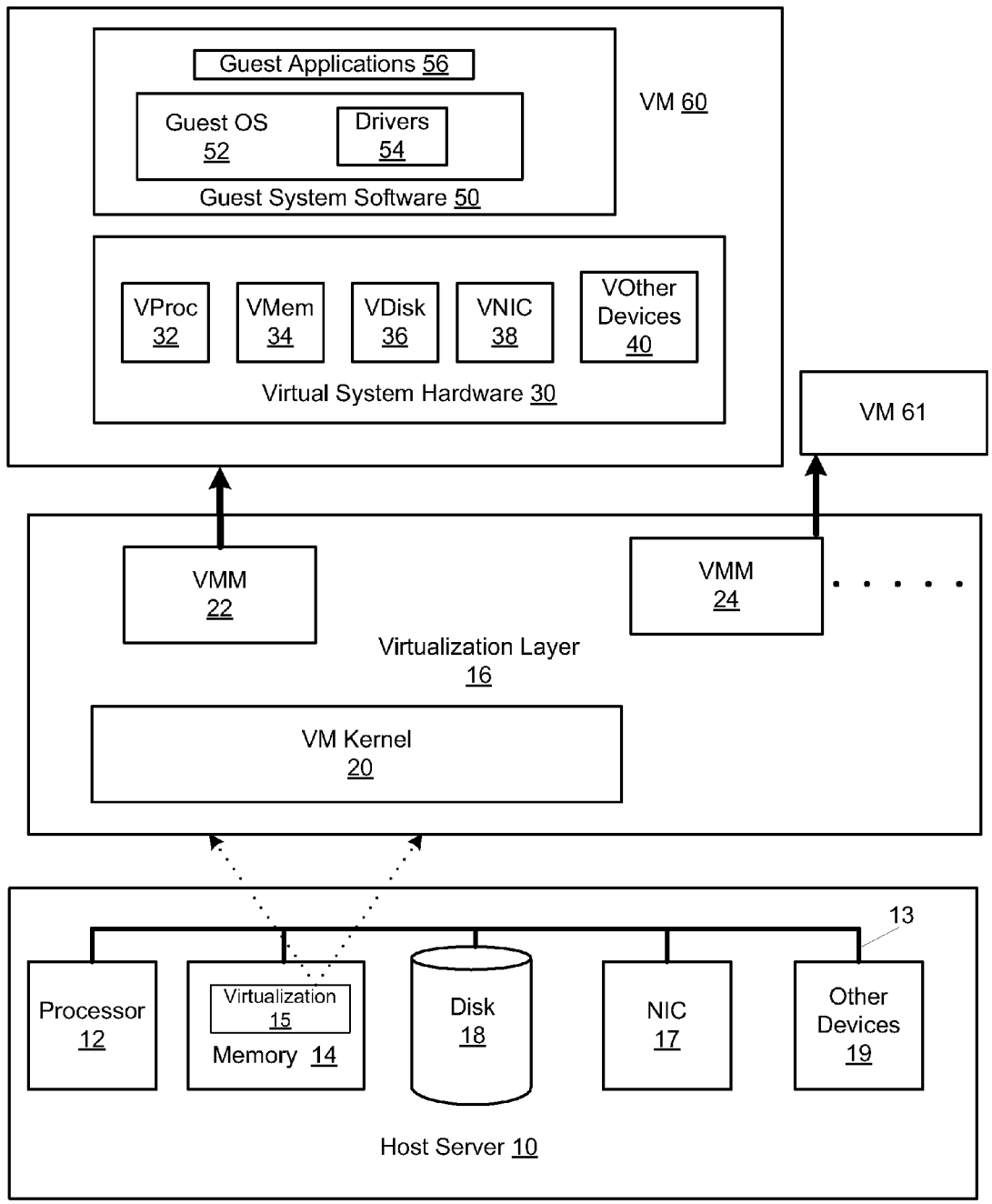
FIG. 1 is a block diagram of a host server that provides virtualization technology by supporting one or more virtual machines ("VM"s), and that can be used to implement one embodiment.

FIG. 1 is a block diagram of a host server that provides virtualization technology by supporting one or more virtual machines ("VM"s), and that can be used to implement one embodiment. Host 10 includes a bus 13 or other communication mechanism for communicating information among the components of host 10. Host 10 further includes a processor 12 for processing information. Processor 12 may be any type of general or specific purpose processor. In one embodiment, processor 12 is one or more x86 architecture-based processors. Host 10 further includes a memory 14 for storing information and instructions to be executed by processor 12. Memory 14 can be comprised of any combination of random access memory ("RAM"), read only memory ("ROM"), or any other type of computer readable media. Computer readable media may be any available media that can be accessed by processor 12, and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Host 10 further includes a disk 18 which can be any type of static/non-volatile storage such as a magnetic or optical disk. Host 10 further includes a network interface card 17 or other type of communication device to provide access to a network. Therefore, host 10 may be accessed directly, or remotely through a network. Finally, host 10 may include other devices 19 as required, such as user interface devices, universal serial bus ("USB") ports, etc. Host server 10 may be any type of device that includes a processor and memory and can support one or more VMs as disclosed below.

In one embodiment, memory 14 stores software modules that provide functionality when executed by processor 12. In one embodiment, a virtualization module 15, when executed by processor 12, provides the functionality of a virtualization layer 16. Virtualization layer 16 includes a VM kernel 20 and one or more virtual machine monitors ("VMM"s) 22, 24. In one embodiment, virtualization layer 16 is the ESX Server from VMware, Inc. Virtualization layer 16, in general, is logically interposed between, and interfaces with, host 10 and all virtual machines hosted by host 10.

VM kernel 20 runs directly on the native hardware of host 10 and manages system resources. VM kernel 20 allows one or more VMs 60, 61 to run on host 10 and provides virtual partitioning capabilities between the VMs. VM kernel 20, for each VM on host 10, instantiates VMMs 22, 24. Each VMM 22, 24 monitors the execution of its corresponding VM 60, 61 and determines when its VM requires communication with a physical resource. The VMM may then do one of several things in response, including emulating the resource, providing direct access to the real resource, mediating indirect access to the real resource, or handing the communication to some other entity that emulates the resource. VM 60, as with the other VMs instantiated by VM kernel 20 such as VM 61, includes virtual system hardware 30. Virtual system hardware 30 includes virtual devices that are emulated by VMM 22. Therefore, virtual system hardware 30 is merely a representation of the execution environment of guest system software 50. In the example of FIG. 1, virtual system hardware 30 includes a virtual processor 32, a virtual memory 34, a virtual disk 36, a virtual NIC 38, and a virtual version of other devices 40.

VM 60 further includes guest system software 50 that includes a guest operating system ("OS") 52 and one or more guest applications 56. Guest OS 52 can be any type of commercially available OS, including a Windows-based OS from Microsoft Corp., Linux, Novell Netware, Sun Solaris, etc. Guest OS 52, while operating within VM 60 in one embodiment, requires no modifications to its "off-the-shelf" version that would run on a non-virtualized computer. In other embodiments, guest OS 52 may be modified from its off-the-shelf version, or "para-virtualized", to specifically run within VM 60. Guest OS 52 includes drivers 54 which can be the standard drivers of the OS. Guest applications 56 are any applications that can be executed with guest OS 52. As with guest OS 52, guest applications 56 typically do not need to be modified from their "off-the-shelf" versions to be executed within VM 60.

The embodiment of FIG. 1 may be considered "non-hosted" because virtualization layer 16 is installed directly on the hardware of host 10. In another embodiment, a host operating system such as a Windows OS is stored in memory 14 and directly executed by processor 12. In this embodiment, known as a "hosted" approach, virtualization layer 16 operates with the host operating system.

Figure 2:
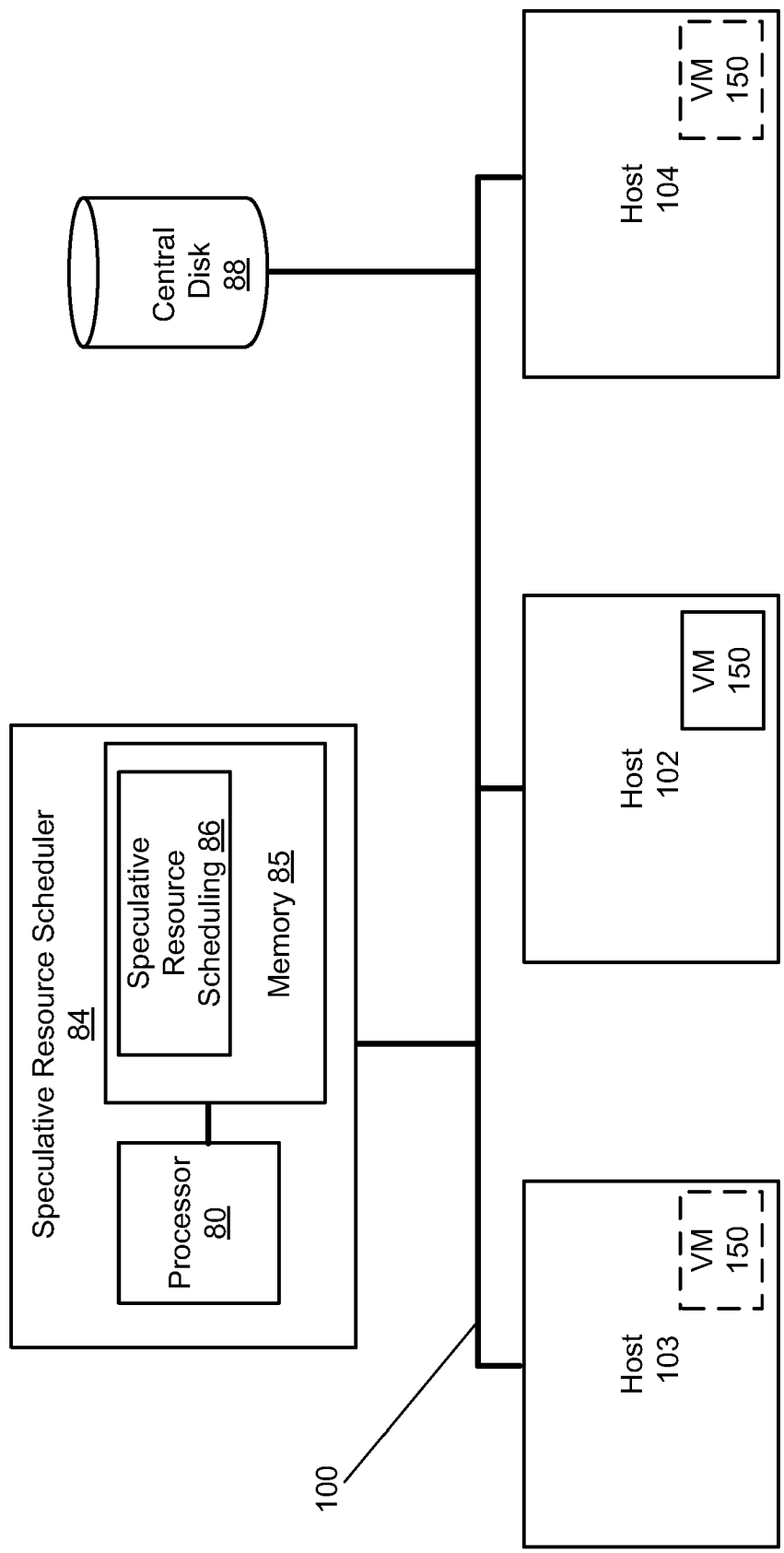
FIG. 2 is a block diagram of a logical resource pool of multiple host servers in accordance with an embodiment.

FIG. 2 is a block diagram of a logical resource pool of multiple host servers 102-104 in accordance with an embodiment. Each host 102-104 is a separate server similar to host 10 of FIG. 1, and can host one or more VMs. Host 102, which can be considered the "primary" host, is coupled to hosts 103-104, which can be considered "secondary" hosts, via a communication link 100. Link 100 can be any mechanism that permits the transfer of data, including wired links, wireless links, optical links, etc. In one embodiment, link 100 is a 10-Gigabit Ethernet link. Hosts 102-104 in aggregate can be considered a logical resource pool.

A speculative resource scheduler 84 is coupled to hosts 102-104 via network link 100. Speculative resource scheduler 84 includes a processor 80 coupled to a memory 85. Processor 80 can be any type of processor similar to processor 12 of FIG. 1, and memory 85 can be any type of computer readable media similar to memory 14 of FIG. 1. Memory 85 includes a speculative resource scheduling module 86, which includes instructions that when executed by processor 80, schedules VMs on different hosts within a logical resource pool on a speculative basis, as disclosed in more detail below. In one embodiment, a central disk 88 is coupled to hosts 102-104 via link 100 to provide static/non-volatile storage of VMs managed by speculative resource scheduler 84.

Host 102 hosts VM 150 which executes a guest OS similar to VM 60 of FIG. 1. In one embodiment, speculative resource scheduler 84 issues commands that cause VM 150 to physically migrate to host 103 or host 104 by powering down or suspending the VM on the primary host (i.e., host 102), and powering up or resuming the VM on a different secondary host (i.e., host 103 or host 104). In one embodiment, the migration involves copying the entire memory and system state of VM 150 from the primary host to the secondary host. Depending on the amount of data and the speed and capacity of link 100, the total migration process may take multiple minutes or longer because it requires a transfer of a large amount of data across the link and involves transferring large amounts of data to the disks of the respective hosts. In one embodiment, the migration is performed using VMotion from VMware, Inc.

In order to efficiently utilize host resources (e.g., processors, memory, disks, etc.), VMs may be migrated among hosts within a logical resource pool. For example, Distributed Resource Scheduler ("DRS") from VMware, Inc. dynamically allocates and balances computing capacity across a collection of hardware resources. DRS continuously monitors utilization across resource pools and allocates available resources among VMs based on pre-defined rules that reflect business needs and changing priorities. For example, when a VM experiences an increased load, resources can be allocated to that VM by either migrating it to another host in the logical resource pool or by making more "space" for it on the same host by migrating other VMs to different hosts.

However, DRS and other known VM schedulers base decisions to migrate on past behavior of VMs. In hindsight, a decision to move a VM may turn out to be incorrect and the VM may need to be migrated back to its original host. For example, an application on a VM when moved to a secondary host may unexpectedly clash for resources with another application on the secondary host. Since it may take a few minutes to migrate a VM, and a few minutes to migrate the VM back to its original host, an incorrect decision can be costly in terms of wasted resources and time delays.

In contrast, in one embodiment speculative resource scheduler 84, speculatively migrates VM 150 by issuing commands to create a duplicate VM on a secondary host or multiple secondary hosts, and to keep the primary and secondary VMs running substantially simultaneously while monitoring resources of all of the hosts in real time. It then makes a decision on which VM to keep running, and issues commands to shut the other VM or VMs down when appropriate, as disclosed in detail below, which completes the migration. Therefore, the decision to migrate the VM can be made based at least in part on real-time resource information rather than past resource information.

Figure 3:
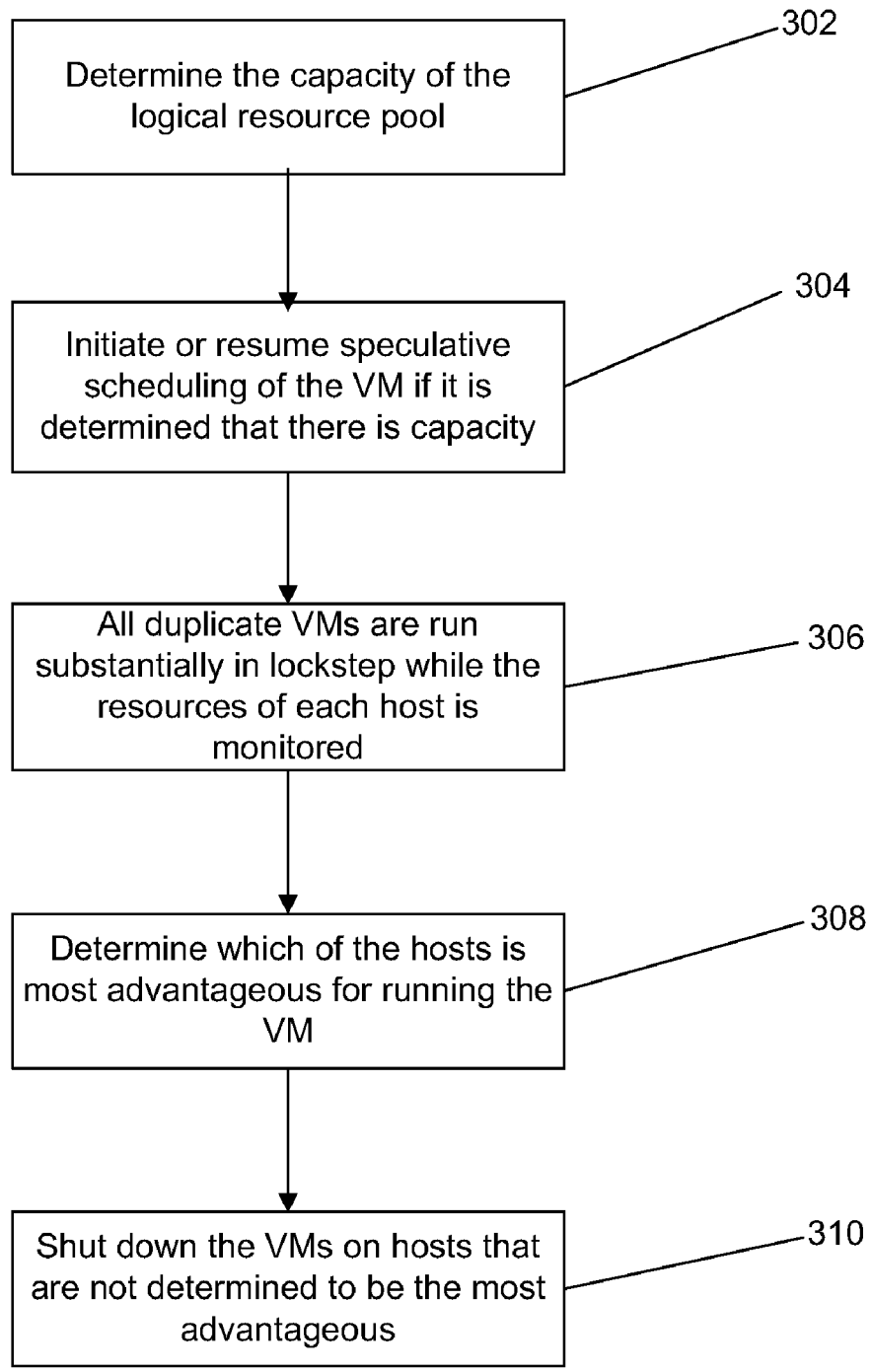
FIG. 3 is a flow diagram of the functionality of a speculative resource scheduler or other resources of the logical resource pool when speculatively scheduling resources within the logical resource pool of FIG. 2 in accordance with one embodiment.

FIG. 3 is a flow diagram of the functionality of speculative resource scheduler 84 or other resources of the logical resource pool when speculatively scheduling resources within the logical resource pool of FIG. 2 in accordance with one embodiment. In one embodiment, the functionality of the flow diagram of FIG. 3 is implemented by software stored in memory or other computer readable or tangible media, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. In one embodiment, the functionality of speculative resource scheduler 84, rather than located centrally as in FIG. 2, can be located on one of the hosts of the logical resource pool (e.g., in the virtualization layer of the host, in a VM hosted by the host, etc.), or spread out among the hosts of the logical resource pool as a fabric.

Initially, VM 150 is running on primary host 102. At 302, while VM 150 is running, the available capacity of the resources of the logical resource pool is determined. The available capacity may be based on the capacity of network link 100, the capacity of the processor, disk, memory, etc. of each host, and the loads on each host. The available capacity of a host can be determined in one embodiment by querying the host, which keeps track of its available capacity and current load for the host as a whole and for each individual hosted VM. In one embodiment, the process of migrating VM 150 is performed whenever there is available capacity in the network link regardless of the resources/capacity of the hosts. The migration process may take longer than normal because it may be temporarily stopped when network capacity is needed and then resumed. However, any unused capacity can be efficiently exploited since it would not otherwise be used during the migration.

At 304, if it is determined that there is capacity on the logical resource pool at 302, a "migration" or a "speculative scheduling" of VM 150 to a secondary host is initiated (or resumed if it previously had been initiated). In one embodiment, migration involves issuing commands for the initiation of the creation of a duplicate copy of VM 150 using known migration methods, such as VMotion, but not suspending or shutting down the VM on the primary host when the migration is complete. VM 150 may be migrated to the secondary host that has the most available resources/capacity or with any available capacity, or it may be migrated to multiple hosts. In other embodiments, known prediction-based DRS schedulers can be used to initially determine the one or more secondary hosts.

At 306, after VM 150 is duplicated on one or more secondary VMs, all VM 150s are run substantially simultaneously or in "lockstep" (i.e., two copies of the VM executing redundantly) while the resources (e.g., processor usage, memory usage, disk usage, etc.) of each host are monitored. In one embodiment, the VMs are run substantially in lockstep through the use of VM Record/Replay from VMware Inc. VM Record/Replay records the complete execution behavior of a VM which can then be duplicated to another VM. Therefore, duplicate VMs can be run substantially in lockstep (there is a small delay in operation) and be completely synchronized. In order to run a primary VM and a secondary VM in lockstep, in one embodiment each VM corresponding executed processor instruction from the primary VM host is transmitted to the secondary VM host. In another embodiment, only the inputs/interrupts (e.g., mouse movement, network requests) from the primary VM host are transmitted to the secondary VM host. In each of these embodiments, the outputs from all VMs except the primary VM are discarded to avoid duplicate outputs.

At 308, as the duplicate VM 150s are being run in lockstep, it is determined which of the hosts is advantageous for running VM 150. The determination may be based on available resources (e.g., processor cycles, RAM, disk I/O, network I/O) vs. capacity (e.g., which host has lowest processor utilization overall). In other embodiments, the determination may be based on other metrics such as the observed performance of: (1) the secondary host (e.g., does moving the VM to that secondary host make its processor or network utilization go closer/farther towards a desired target); (2) the target VM measured at the hardware level (e.g., does the secondary VM execute more processor instructions or disk I/O operations, or fewer, compared to the primary VM it was migrated from); (3) the target VM measured at the application or workload level (e.g., can more or fewer credit card transactions be processed per second in the secondary VM as compared to the primary VM); or (4) the performance of other VMs on the same host, either at the hardware or workload level. For each of these metrics, the overall goal may be to balance the load across all hosts or VMs, or move a VM from a host when the load on the host exceeds a predetermined level (e.g., 80% usage). Other algorithms may be based on increasing throughput or resource availability for a given VM, decreasing power consumption overall for the logical resource pool, or minimizing the number of hosts necessary to meet performance requirements. Any other algorithms and/or metrics may be used to determine an advantageous host.

At 310, the VM 150s on hosts that are not determined to be the most optimal at 308 are shut down or powered down, leaving a VM 150 running on a single host. The remaining host may be the original primary host or may be one of the secondary hosts. If it is a secondary host, then VM 150 can be considered to have been migrated to another host. However, unlike known migration techniques, this migration will appear to be nearly instantaneous to the scheduler since the migrated VM was already running on the secondary host when the decision to migrate was made. In one embodiment, when a VM is shut down, it is discarded on the corresponding host. In other embodiments, the data for the VM is stored on its corresponding host, or on central disk 88, so that if the VM needs to be recreated at a later time only the incrementally new data has to be transmitted between hosts.

As disclosed, one or more embodiments create duplicate VMs on secondary hosts when capacity on a network connecting the hosts exist. In this manner, a decision to migrate a VM can be based on real-time resource information and can be executed substantially instantaneously.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of scheduling a virtual machine (VM), hosted by a primary host server, the method comprising:
   creating at least one duplicate VM on a secondary host server;
   running the VM and the duplicate VM substantially in lockstep while monitoring resources on the primary host server and the secondary host server;
   determining an advantageous host server among the primary host server and the secondary host server; and
   based at least in part on the determination, powering down one of the VM on the primary host server or the duplicate VM on the secondary host server,
   wherein at least one of the creating, the running, the determining and the powering down is executed by at least one processor.

2. The method of claim 1, wherein the primary host server and the secondary host server are coupled via a network, and the creating comprises determining when the network has available capacity.

3. The method of claim 2, wherein the VM comprises a memory and system state, and the creating comprises copying the memory and system state from the primary host server to the secondary host server over the network when it is determined that the network has available capacity.

4. The method of claim 1, wherein the running the VM and the duplicate VM substantially in lockstep comprises recording an execution behavior of the VM on the primary host server.

5. The method of claim 1, wherein the monitoring resources comprises determining at least one of: processor usage, memory usage and disk usage.

6. The method 1, further comprising migrating the VM to the secondary host server when the VM on the primary server is powered down.

7. The method of claim 1, wherein the determining an advantageous host server comprises comparing an operating performance of the primary host server and the secondary host server.

8. The method of claim 1, wherein the determining an advantageous host server comprises comparing available resources and capacities of the primary host sever and the secondary host server.

9. The method of claim 1, wherein the determining an optimal host server comprises comparing performance characteristics of the VM and the duplicate VM.

10. The method of claim 1, wherein the primary host server and the secondary host server comprises a logical resource pool and the creating comprises determining available resources of the logical resource pool.

11. A computer readable storage media having instructions stored thereon that, when executed by a processor, causes the processor to schedule a virtual machine ("VM"), wherein the VM is hosted by a primary host server, the scheduling comprising:
    initiating a creation of at least one duplicate VM on a secondary host server;
    while the VM and the duplicate VM are run substantially in lockstep, monitoring resources on the primary host server and the secondary host server;
    determining an advantageous host server among the primary host server and the secondary host server; and
    based at least in part on the determination, causing a shutting down of one of the VM on the primary host server or the duplicate VM on the secondary host server.

12. The computer readable storage media of claim 11, wherein the primary host server and the secondary host server are coupled via a network, and the initiating a creation comprises determining when the network has available capacity.

13. The computer readable storage media of claim 12, wherein the VM comprises a memory and system state, and the initiating a creation comprises copying the memory and system state from the primary host server to the secondary host server over the network when it is determined that the network has available capacity.

14. The computer readable storage media of claim 11, wherein the VM and the duplicate VM are run substantially in lockstep by recording an execution behavior of the VM on the primary host server.

15. The computer readable storage media of claim 11, wherein the monitoring resources comprises determining at least one of: processor usage, memory usage and disk usage.

16. The computer readable storage media of claim 11, further comprising causing a migration of the VM to the secondary host server when the VM on the primary server is shut down.

17. The computer readable storage media of claim 11, wherein the determining an advantageous host server comprises comparing an operating performance of the primary host server and the secondary host server.

18. The computer readable storage media of claim 11, wherein the determining an advantageous host server comprises comparing available resources and capacities of the primary host sever and the secondary host server.

19. The computer readable storage media of claim 11, wherein the determining an advantageous host server comprises comparing performance characteristics of the VM and the duplicate VM.

20. The computer readable storage media of claim 11, wherein the primary host server and the secondary host server comprise a logical resource pool and the initiating a creation comprises determining available resources of the logical resource pool.

21. The computer readable storage media of claim 11, wherein the processor is located central to the primary host server and secondary host server.

22. The computer readable storage media of claim 11, wherein the processor is located on the primary host server or the secondary host server.

23. The computer readable storage media of claim 11, wherein the processor is located on the primary host server and the secondary host server.

24. A speculative resource scheduler for scheduling a virtual machine (VM), wherein the VM is hosted by a primary host server, the scheduler comprising:
 means for creating at least one duplicate VM on a secondary host server;
 means for running the VM and the duplicate VM substantially in lockstep while monitoring resources on the primary host server and the secondary host server;
 means for determining an advantageous host server among the primary host server and the secondary host server; and
 based at least in part on the determination, means for powering down one of the VM on the primary host server or the duplicate VM on the secondary host server,
 wherein an operation of at least one of the creating means, the running means, the determining means and the powering down means is executed by at least one processor.

25. A method of operating a logical resource pool that comprises a primary host server and at least one secondary host server, wherein the primary host server hosts a virtual machine (VM), the method comprising:
 determining a level of capacity of the logical resource pool;
 based at least in part on the determined level, creating a duplicate of the VM on the secondary host server;
 operating the VM and the duplicate substantially simultaneously until it is determined that either the primary host server or the secondary host server should host the VM; and
 if it is determined that the secondary host server should host the VM, powering down the VM on the primary host server while continuing to operate the duplicate,
 wherein at least one of the determining, the creating, the operating and the powering down is executed by at least one processor.

26. The method of claim 25, wherein the determining the level of capacity comprises at least one of: determining a capacity of network links of the logical resource pool; determining a capacity of at least one of a processor, a disk, or a memory of the secondary host server; or determining a load of the secondary host server.

27. The method of claim 25, wherein it is determined that the secondary host server should host the VM based in part on a performance comparison of the primary host server and the secondary host server.

* * * * *